United States Patent
Peng et al.

(10) Patent No.: US 10,958,295 B2
(45) Date of Patent: Mar. 23, 2021

(54) COMPLEX DOMAIN BEAMFORMING SYSTEM AND METHODS RELATING THERETO

(71) Applicant: TEXAS TECH UNIVERSITY SYSTEM, Lubbock, TX (US)

(72) Inventors: Zhengyu Peng, Lubbock, TX (US); Changzhi Li, Lubbock, TX (US); Lixin Ran, Zhejiang (CN)

(73) Assignee: TEXAS TECH UNIVERSITY SYSTEM, Lubbock, TX (US)

( * ) Notice: Subject to any disclaimer, the term of this patent is extended or adjusted under 35 U.S.C. 154(b) by 0 days.

(21) Appl. No.: 16/335,217

(22) PCT Filed: Sep. 20, 2017

(86) PCT No.: PCT/US2017/052529
§ 371 (c)(1),
(2) Date: Mar. 20, 2019

(87) PCT Pub. No.: WO2018/057631
PCT Pub. Date: Mar. 29, 2018

(65) Prior Publication Data
US 2019/0372609 A1    Dec. 5, 2019

Related U.S. Application Data

(60) Provisional application No. 62/397,221, filed on Sep. 20, 2016.

(51) Int. Cl.
*H04B 7/08* (2006.01)
*H01Q 3/24* (2006.01)
(Continued)

(52) U.S. Cl.
CPC ......... *H04B 1/0007* (2013.01); *H01Q 3/2611* (2013.01); *H04B 7/0837* (2013.01)

(58) Field of Classification Search
CPC .......... H01Q 3/00; H01Q 3/26; H01Q 3/2611; H01Q 3/2617; H01Q 3/24; H01Q 3/2605;
(Continued)

(56) References Cited

U.S. PATENT DOCUMENTS 9,184,829 B2 * 11/2015 Miller .................... H04B 7/212
2007/0194991 A1 * 8/2007 Mohamadi ........... H01Q 21/062
343/700 MS
(Continued)

FOREIGN PATENT DOCUMENTS

WO    2006125081 A2    11/2006

OTHER PUBLICATIONS

Officer Jacques Reichert; International Search Report and Written Opinion; PCT/US2017/052529; dated Dec. 22, 2017; 13 pages.

*Primary Examiner* — Blane J Jackson
(74) *Attorney, Agent, or Firm* — Dickinson Wright PLLC; Kristopher Lance Anderson

(57) ABSTRACT

Disclosed is a system and method for a complex domain radio frequency (RF) frontend, adaptive beamforming can separate the relatively slowly changed waveform delay information required from wideband RF signals, upon which a self-contained beamforming system is implemented with a low-speed baseband. By introducing vector RF multipliers in the frontend of the present invention, the amplitude and phase of RF signals are simultaneously controlled by the real and imaginary parts of complex numbers, such that beamforming algorithms derived in complex domain can be directly applied without any form of transformation. By doing so, the massive use of conventional T/R modules and high-speed baseband devices can be avoided, thus simplifying the realization and decreasing the cost of wideband digital beamforming systems for use in low cost, power efficient beamforming applications.

13 Claims, 19 Drawing Sheets

(51) Int. Cl.
*H04B 1/00* (2006.01)
*H01Q 3/26* (2006.01)

(58) Field of Classification Search
CPC .......... H04B 7/06; H04B 7/0617; H04B 7/08;
H04B 7/0802; H04B 7/0805; H04B
7/08028; H04B 7/0842
See application file for complete search history.

(56) References Cited

U.S. PATENT DOCUMENTS

2011/0159877 A1\* 6/2011 Kenington ............. H01Q 1/246
455/445
2011/0268037 A1 11/2011 Fujimoto
2017/0288769 A1\* 10/2017 Miller .................... H04B 7/212

\* cited by examiner

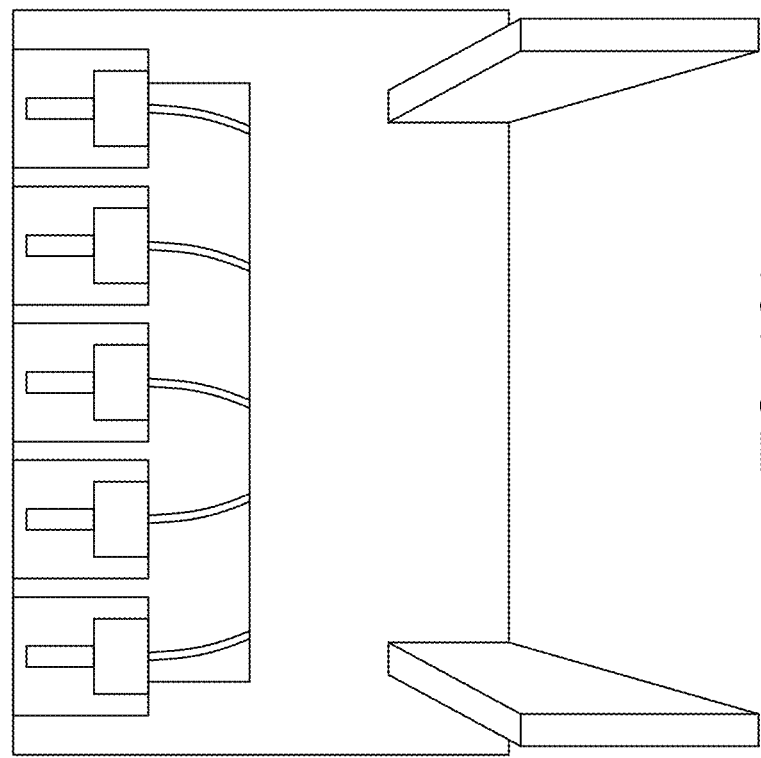
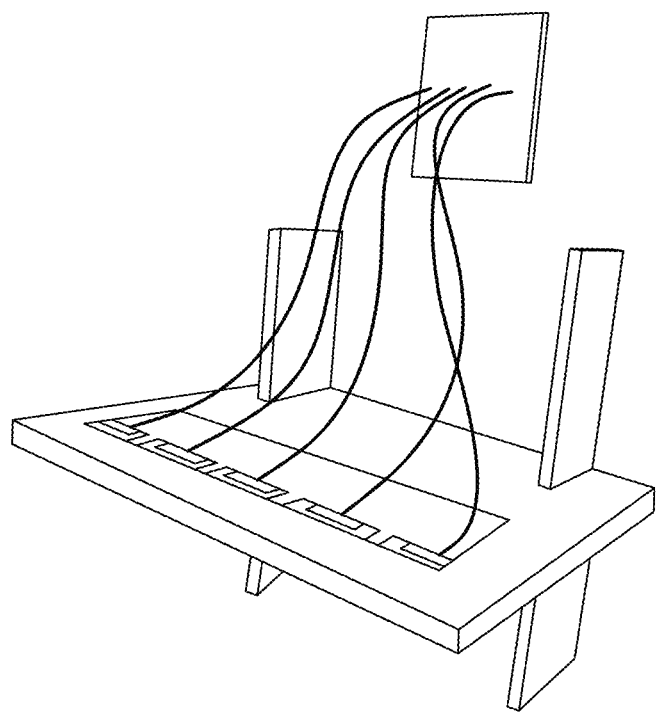
FIG. 10B
FIG. 10A

COMPLEX DOMAIN BEAMFORMING SYSTEM AND METHODS RELATING THERETO

CROSS-REFERENCE TO RELATED APPLICATIONS

This application is a U.S. 371 National Phase Patent Application filing of PCT/US2017/052529, filed on Sep. 20, 2017, entitled "Complex Domain Beamforming System And Methods Relating Thereto," which claims priority to U.S. Provisional Patent Application Ser. No. 62/397,221, filed on Sep. 20, 2016, entitled "Complex Domain Beamforming System And Methods Relating Thereto". The foregoing patent applications are hereby incorporated herein by reference in their entirety for all purposes.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

TECHNICAL FIELD

The present invention relates in general to the field of radio frequency beamforming. In particular, the system provides for a complex domain beamforming system based on vector radio frequency multipliers. The disclosed systems and methods support a wide variety of scenarios and includes various products and services.

STATEMENT OF FEDERALLY FUNDED RESEARCH

None.

BACKGROUND OF THE INVENTION

Phased array antennas significantly extend the capability of conventional antennas by enabling the functionality of adaptive beamforming. In modern communication and radar systems, beamforming technique has been widely used to not only steer and shape the lobes of radiation patterns so as to obtain optimal signal performance, but also to control the nulls to suppress directional interference and improve the noise performance. Due to these advantages, phased array antennas with beamforming functions have been widely used in modern civil and military systems like radars, radio telescopes, acoustic applications and radio communication systems.

Beamforming can be realized in either radio frequency (RF) domain or baseband (BB) domain. Nowadays, BB beamforming based on the state-of-the-art highly adaptive phased array is the main stream. Compared with the conventional RF beamforming that relies on analog RF phase shifters, such BB beamforming systems are based on the concept of software defined radio (SDR) architecture that combines antenna elements with RF frontends (transmitter/receiver (T/R) modules), analog-to-digital converters (ADCs), and digital signal processors (DSPs) to provide the maximum flexibility in achieving high-performance adaptive beamforming. For a wideband BB beamforming system, the massive use of high-speed ADCs is inevitable. Consequently, digital down-converters (DDCs) are needed to convert the digitized intermediate frequency (IF) signals to baseband. In order to handle the wideband data and complex beamforming algorithms in digital domain, a high-performance processing unit is required in baseband, typically implemented by high-speed DSPs or field programmable devices, such as FPGAs. All these high-speed digital and digital-analog mixed devices are expensive and power hungry. Therefore, the hardware expense, power consumption and structural complexity of a high-performance BB beamforming phased array system directly increase with the number of RF channels, making the implementation of a large-scale BB beamforming system a complex and challenging task.

SUMMARY OF THE INVENTION

Although radar or communication signal processing in wideband phased array systems has to process wideband signals in digital domain, it is not necessary for the beamforming processing to also handle such signals. In fact, the implementation of beamforming relies on the waveform delay between RF signals received in different channels, instead of the information carried by the bandwidth of the signals. If such slowly changed, waveform delay information can be separated from time-domain RF signals, a self-contained beamforming system can be implemented in RF domain. In this case, only a one-channel SDR receiver is needed to demodulate the information carried by RF signals, and therefore the massive use of wideband T/R modules and high-speed devices can be effectively avoided.

In order to realize such an RF domain beamforming, the present invention presents a "complex domain" RF frontend, which is able to separate the waveform delay information from the RF signals, and individually control the amplitude and phase of each RF signal. Since all the signals of the waveform delay and the amplitude/phase control are slow signals, low-frequency ADCs, DACs and DSPs can be used in the implementation of adaptive beamforming.

In one aspect of the invention, vector RF multipliers are introduced in the proposed frontend, such that the amplitude and phase of RF signals can be simultaneously controlled by the real and imaginary parts of complex numbers. Therefore, beamforming algorithms derived in complex domain can be directly applied without any form transformation. As a self-contained RF domain beamforming system, its output can be directly connected to any available receivers, including SDR receivers, enabling conventional receivers to easily gain beamforming functions. An experimental prototype is designed and fabricated based on commercial components. The demonstrations of adaptive nulling and broadening of radiation pattern validate the effectiveness of the proposed approach.

It is therefore an object of the present invention to provide a self-contained beamforming system, comprising: one or more antenna elements; one or more corresponding radiofrequency (RF) amplifiers; one or more corresponding waveform delay detectors; and one or more corresponding vector multipliers, wherein the one or more corresponding waveform delay detectors obtain waveform delays received by the one or more RF signals received by the one or more antenna elements.

It is another object of the present invention to provide a beamforming method, comprising: increasing the gain of one or more radiofrequency (RF) signals obtained from an antenna element using one or more corresponding radiofrequency (RF) amplifiers; detecting waveform delay of the one or more RF signals; and simultaneously controlling the amplitude and waveform delay of one or more RF signals.

It is another object of the present invention to provide a self-contained beamforming system, comprising: one or more antenna elements for receiving one or more radiofrequency (RF) signals; one or more corresponding RF amplifiers; one or more corresponding waveform delay detectors; and one or more corresponding vector multipliers; wherein the one or more corresponding waveform delay detectors obtain waveform delays received by the one or more RF signals received by the one or more antenna elements.

In one aspect, the system further comprises a reference signal. In another aspect the one or more corresponding RF amplifiers provide gains to the corresponding one or more RF signals. In another aspect the one or more corresponding waveform delay detectors obtain the waveform delays between the reference signal and the one or more corresponding RF signals.

In another aspect, the system comprises the one or more corresponding vector multipliers performing beamforming in RF domain via implementation of simultaneous control to the amplitude and waveform delay of each one or more corresponding RF signal.

The system is capable of automatically synthesizing a beam with a wide-angle coverage and a single deep null pointing to a direction of no interest. In another aspect the amplitude and phase of the one or more RF signals are simultaneously controlled by real and imaginary parts of complex numbers. The resulting beamforming is performed without the use of T/R modules and high-speed baseband devices.

It is another object of the present invention to provide a beamforming method, comprising: increasing the gain of one or more radiofrequency (RF) signals obtained from one or more corresponding antenna elements; detecting waveform delay of the one or more RF signals; and simultaneously controlling the amplitude and waveform delay of one or more RF signals.

In one aspect the method of the present invention comprises obtaining a reference signal from an RF amplifier. In another aspect the method comprises providing gains to the corresponding one or more RF signals using one or more corresponding RF amplifiers. In another aspect the method comprises obtaining the waveform delays between the reference signal and one or more RF signals via one or more corresponding waveform delay detectors.

In another aspect the method of the present invention comprises performing beamforming in RF domain via implementation of simultaneous control to the amplitude and waveform delay of each one or more corresponding RF signal using one or more corresponding vector multipliers.

In another aspect the method of the present invention comprises performing beamforming in RF domain by simultaneously controlling the amplitude and waveform delay of each corresponding RF signal. In another aspect the method comprises automatically synthesizing a beam with a wide-angle coverage and a single deep null pointing to a direction of no interest.

In another aspect the method of the present invention comprises simultaneously controlling the amplitude and phase of the one or more RF signals by real and imaginary parts of complex numbers to directly apply beamforming algorithms without needing any form of transformation.

In another aspect the method of the present invention comprises performing beamforming without the use of T/R modules and high-speed baseband devices.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the present invention will be apparent from the following description of embodiments as illustrated in the accompanying drawings, in which reference characters refer to the same parts throughout the various views. The drawings are not necessarily to scale, emphasis instead being placed upon illustrating principles of the present invention:

FIG. 10A depicts a photograph showing five-element linear array of the present invention.

FIG. 10B depicts a photograph showing the connection between the linear array and the RF frontend.

DETAILED DESCRIPTION OF THE INVENTION

Figure 1:
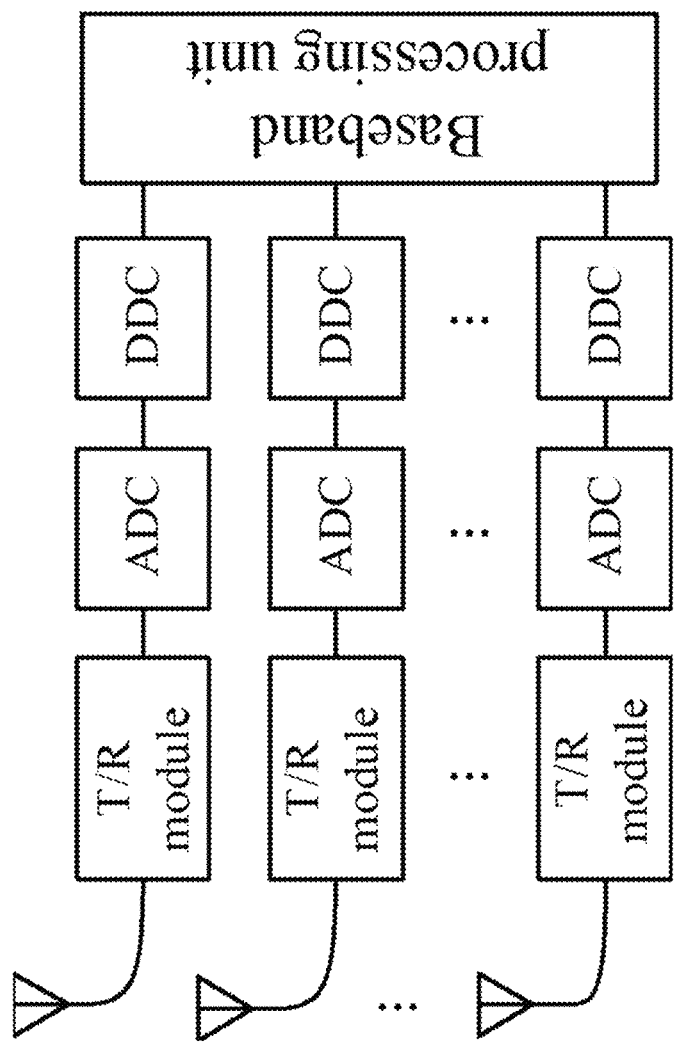
FIG. 1 depicts a block diagram of the SDR architecture of digital domain beamforming.

While the making and using of various embodiments of the present invention are discussed in detail below, it should be appreciated that the present invention provides many applicable inventive concepts that can be embodied in a wide variety of specific contexts, goods, or services. The specific embodiments discussed herein are merely illustrative of specific ways to make and use the present invention and do not delimit the scope of the present invention.

All publications and patent applications mentioned in the specification are indicative of the level of skill of those skilled in the art to which the present invention pertains. All publications and patent applications are herein incorporated by reference to the same extent as if each individual publication or patent application was specifically and individually indicated to be incorporated by reference.

The present invention will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present invention is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

A network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), North American/CEPT frequencies, radio frequencies, single sideband, radiotelegraphy, radioteletype (RTTY), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of the present invention, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a mobile device may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages. The client device, mobile device, or wireless communication device, in accordance with the present invention may be a portable or mobile telephone, a Personal Digital Assistant (PDA), a wireless video or multimedia device, a portable computer, an embedded communication processor or similar wireless communication device. In the following description, the communication device will be referred to generally as User Equipment (UE) for illustrative purposes and it is not intended to limit the present invention to any particular type of communication device. Certain modern handheld electronic devices (UE) comprise the necessary components to connect to a cellular network, such as a 2G, 2.5G, 3G, and/or LTE network, and the necessary components to connect to a non-cellular IP Connectivity Access Network (IP CAN) such as a wireless LAN network (e.g. IEEE 802.11a/b/g/n) or a wired LAN network (e.g. IEEE 802.3).

The principles discussed herein may be embodied in many different forms. The preferred embodiments of the present invention will now be described where for completeness, reference should be made at least to the Figures.

For comparison, the prior art FIG. 1 illustrates the block diagram of an SDR architectured BB beamforming system, in which the RF signal received by each antenna element is amplified and down-converted to IF by a T/R module, digitized by an ADC, and then down-converted to baseband in digital domain by the DDC, sequentially. Beamforming algorithms are performed in the baseband processing unit, which is normally implemented with high-speed DSPs and/or FPGAs devices. For a wideband beamforming system, all the ADCs, DDCs and baseband processors are high-speed, power consuming devices, making the hardware cost, power consumption and system complexity proportional to the scale to the phased array system.

Although the architecture in FIG. 1 has been proven to be able to provide high-performance BB beamforming, as indicated, it is not a cost-efficient architecture. In essence, adaptive beamforming is achieved by dynamically tuning the shape and direction of the lobes and/or the nulls of the radiation pattern, which are finally determined by the amplitude and phase distribution on the radiation aperture. For phased array based beamforming, the aperture distribution is tuned by controlling the amplitude and waveform delay of the RF signals received by different antenna elements, either in RF domain or BB domain. In practice, the change of such amplitude and waveform delay is usually in second or millisecond level. Therefore, a phased array based beamforming system is not necessarily a wideband system. The SDR based phased array architecture has significant advantages for wideband radar or communication signal processing. However, it can be very redundant for the beamforming signal processing.

According to the above rationale, if the slow signals reflecting the change of amplitude and waveform delay of RF signals can be conveniently separated and controlled, a self-contained, beamforming system can be implemented in RF domain, along with a one-channel receiver to demodulate the information carried by the RF signal.

Figure 2:
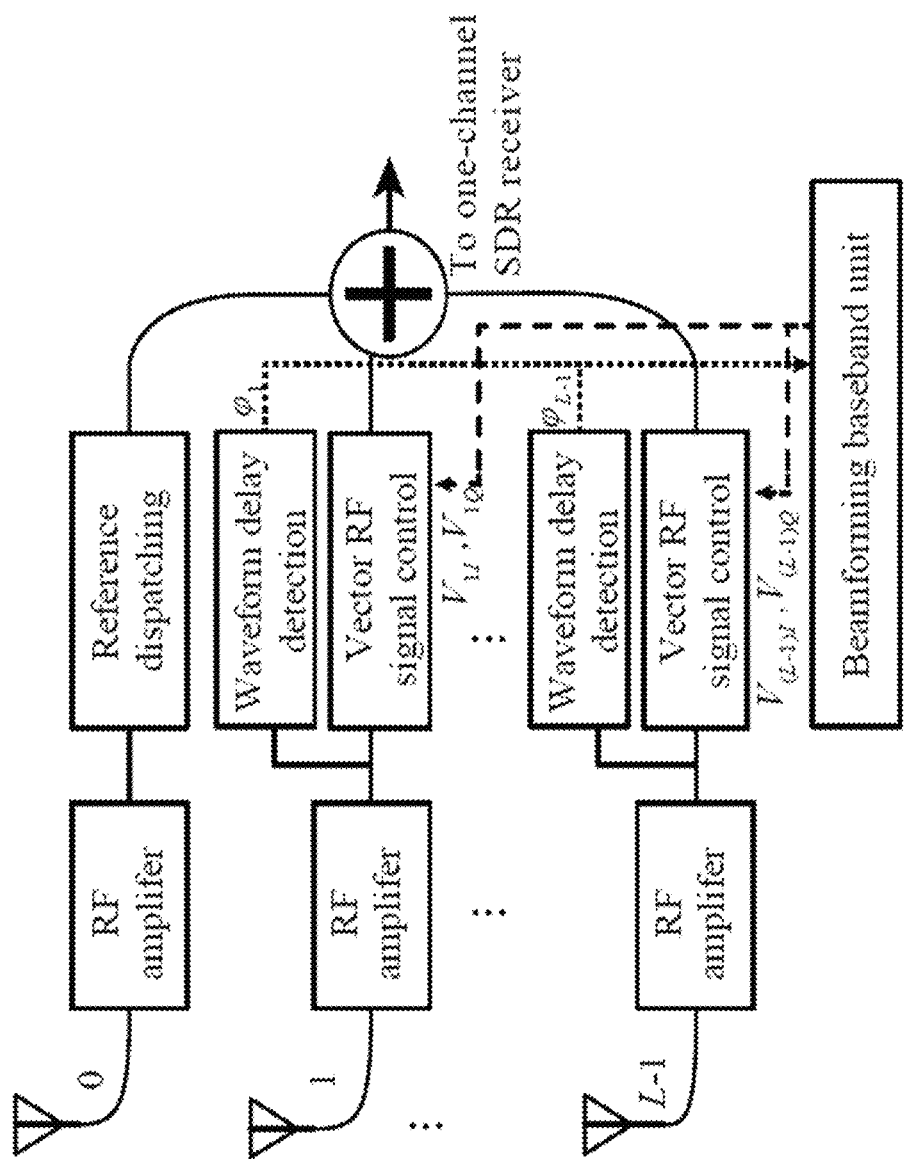
FIG. 2 depicts a block diagram of the architecture of an RF domain beamforming system.

FIG. 2 shows the proposed block diagram for such a system of the present invention. Firstly, RF amplifiers are used to replace the T/R modules, to provide gains to all the received signals. The amplified RF signal in channel 0 is used as the reference signal, and the waveform delays between this reference signal and the other RF signals received by different antenna elements can be obtained by wideband waveform delay detectors. In the meantime, vector multipliers are used to implement simultaneous control to the amplitude and waveform delay of each RF signal, performing beamforming in RF domain.

The same as the analysis for conventional phased array antennas, it is assumed the incidence upon the aperture is a plane wave. In this case, the phase difference between the signals received by different radiating elements can be significantly different depending on the angle of incidence. However, the amplitude difference is assumed to be very small due to the fact that the loss of a plane wave transmitted in the air can be ignored within a short distance.

In conventional beamforming systems, the waveform delay between two RF signals received by different antennas is computed in digital domain after the down-conversion and digitization. In RF domain, the detection of such a delay can be simply achieved by analog multiplication.

The RF signals received by two antenna elements can be expressed as:

$$x_1 = A_1 \sin(2\pi ft + \Phi M), \quad (1)$$

$$x_2 = A_2 \sin(2\pi ft + \Phi M + \varphi), \quad (2)$$

where A1 and A2 are the amplitudes, $\Phi(t)$ is the modulated wideband signal, and $\Phi$ is the phase delay between x1 and x2. Consequently, $\Phi/(2\pi f)$ is the waveform delay between x1 and x2. After multiplying x1 with x2, obtained is:

$$x_1(t) \cdot x_2(t) = A_{12} \sin(2\pi ft + \Phi(t)) \cdot \sin(2\pi ft + \Phi(t) + \varphi) \quad (3)$$

$$= \underbrace{\frac{A_{12}}{2} \cos \varphi}_{DC} - \frac{A_{12}}{2} \cos(4\pi ft + 2\Phi(t) + \varphi),$$

where $A_{12} = A_1 A_2$. It is shown that the DC component $A_{12}(\cos \varphi)/2$ can be obtained by filtering the harmonic components from (3), which directly relates to the waveform delay $\varphi/(2\pi f)$ between signals $x_1(t)$ and $x_2(t)$. Note that the coefficient $A_{12}$ depends on the amplitude of the received signals, bringing difficulty to extract $\varphi/(2\pi f)$ from the DC component. In practice, variable gain amplifiers (VGAs) can be used in the RF amplifier chain, such that signals with constant amplitudes $A_1$ and $A_2$ can always be obtained. In this case, $\varphi/(2\pi f)$ can be obtained after the amplitude and phase calibration to the RF frontend.

Figure 3A:
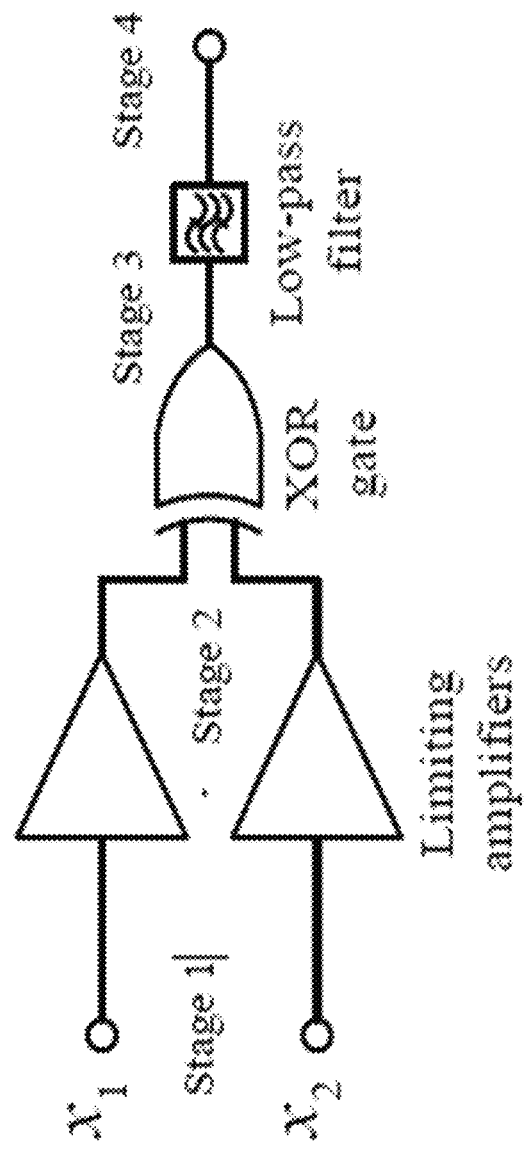
FIG. 3A depicts a schematic of the principle of digitized waveform in a circuit block diagram.
Figure 3B:
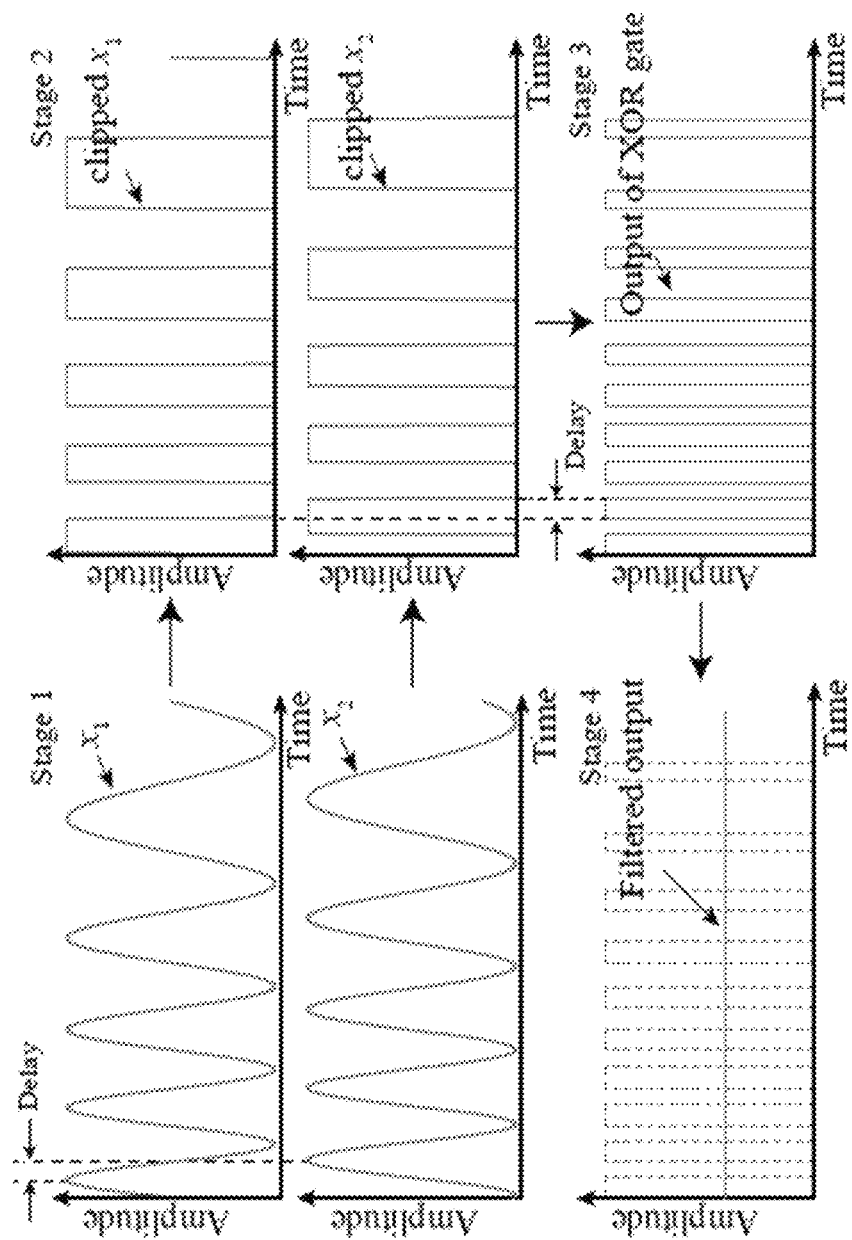
FIG. 3B depicts charts showing waveforms at different stages.

Alternatively, digitized waveform delay detectors can also be used to solve this problem. As shown in FIG. 3A, signals x1 and x2 can firstly be amplified by limiting amplifiers (stage 1), and the clipped output signals with the same amplitude can be further sent to an RF exclusive-or (XOR)

gate (stage 2) and a low-pass filter (stage 3). Since the waveform delay will determine the width of the output clipped pulses of the XOR gate, after a low-pass filter, the obtained DC voltage at stage 4 will be linearly proportional to the waveform delay [28]. With the rapid progress of RF CMOS technology, commercial RF phase detectors such as the Analog Devices' AD8302 have integrated similar structure as shown in FIG. 3A. In an illustrative embodiment of the present invention, this device is presented as a building block in the experimental prototype, as shown in the following.

It is worth noting that for both of the above embodiments, the output signals containing the waveform delay information are slowly changing signals with respect to the RF carrier frequency, and thus low sampling rate, multi-channel ADCs can be used to digitize such signals for further beamforming processing.

It should be mentioned that when a pulsed waveform is used in the proposed architecture, it is possible that the delay between the signals received by different elements is able to exceed the duration of the pulsed waveform. In this case, the proposed waveform delay detector will not properly work. However, since the pulsed waveform is modulated on the carrier, its duration is always much longer than the period of the carrier. In practice, due to the limited transient response of transmitting channels and the wide use of pulse compression technique, the typical duration of a pulsed waveform is in microsecond scale or even longer. For a duration of 1 to 100 microseconds, the electromagnetic wave is able to travel 300 to 30000 meters. Therefore, the multiple-waveform delay only occurs in the case of extremely large arrays. By properly designing the duration of the pulsed waveform, this issue can be avoided.

In conventional phased array architectures, different components, i.e., phase shifters and amplifiers, are separately used to control the phase and amplitude of RF signals. In the proposed architecture, a single device is used to implement simultaneous vector control of RF signals, to significantly simplify the structure of the RF frontend.

Consider a complex signal $x_i = \exp(-j2\pi ft - j\Phi(t))$ received by an RF channel, where f is the carrier frequency, $\Phi(t)$ is the modulated BB signal. Assuming a complex weighting number $w = R \exp(j\phi)$ with an amplitude R and a phase $\phi$. By multiplying $x_i$ with w, the resultant signal y can be expressed as $$y = Re^{-j(2\pi ft + \Phi(t) - \phi)}. \quad (4)$$

The real part of y is $$Re\{y\} = R\cos(2\pi ft + \Phi(t) - \phi) \quad (5)$$
$$= R\cos\phi \cos(2\pi ft + \Phi(t)) + R\sin\phi \sin(2\pi ft + \Phi(t)),$$

which can be considered as the original signal x modulated by amplitude R and phase $\phi$.

Figure 4:
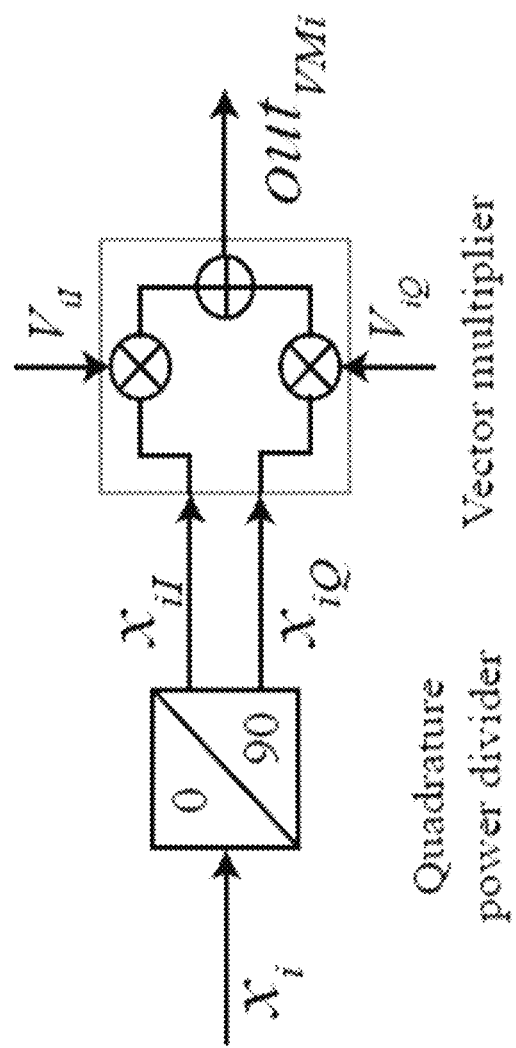
FIG. 4 depicts a diagram the simultaneous vector control of amplitude and phase.

Equation (5) can be realized by a quadrature power divider and a vector multiplier, as shown in FIG. 4. The input signal $x_i$ is divided into in-phase and quadrature-phase signals $x_{iI}$ and $x_{iQ}$ by the quadrature power divider, where $$x_{iI} = \sin(2\pi ft + \varphi(t)), \quad (6)$$

$$x_{iQ} = \cos(2\pi ft + \varphi(t)), \quad (7)$$

Figure 5:
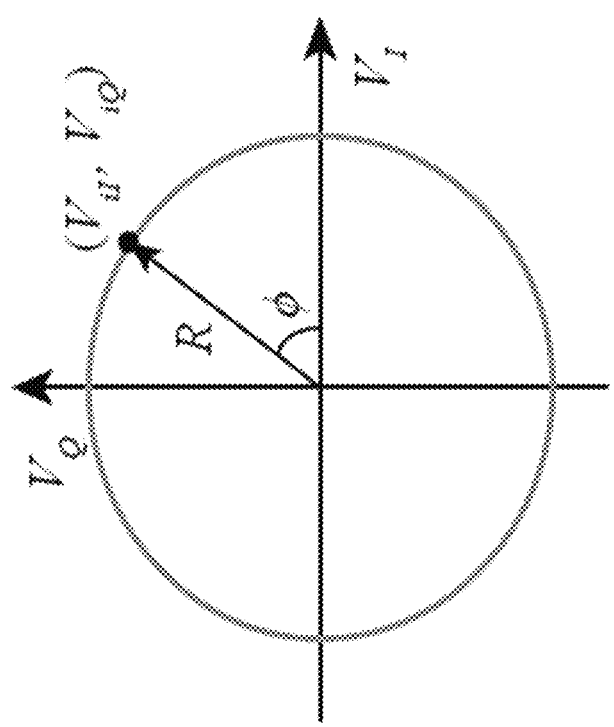
FIG. 5 depicts a schematic of the notation of $V_{iI}$ and $V_{iQ}$ on the complex plane.

The output of the vector multiplier is therefore $$out_{VMi} = V_{iQ}x_{iI} + V_{iI}x_{iQ} \quad (8)$$
$$= V_{iQ}\sin(2\pi ft + \Phi(t)) + V_{iI}\cos(2\pi ft + \Phi(t)),$$

where $V_{iI} = R\cos\phi$ and $V_{iQ} = R\sin\phi$ are direct current (DC) control voltages. FIG. 5 illustrates the relationship between $V_{iI}$, $V_{iQ}$, R and $\phi$, which can be concisely presented by a complex number $V_{iI} + jV_{iQ}$. As long as the phase q and amplitude R are determined, the vector control coefficients $V_{iI}$ and $V_{iQ}$ can be determined, or vice versa. It is seen that this specific "complex domain" architecture is able to bring a lot of convenience in the realization of beamforming algorithms that are mathematically described in complex equations.

According to FIG. 5, the phase $\phi$ is able to continuously take values between 0 and 360 degrees, and the tuning range of the amplitude is only limited by the used device. In phased array and beamforming applications, the time required to change a beam shape is normally in milliseconds. Therefore, multi-channel, low sampling rate, wide bit width DACs can be used to precisely control $V_{iI}$, $V_{iQ}$, R and $\varphi$, providing a cost efficient, high-performance solution for vector RF signal control.

Figure 6:
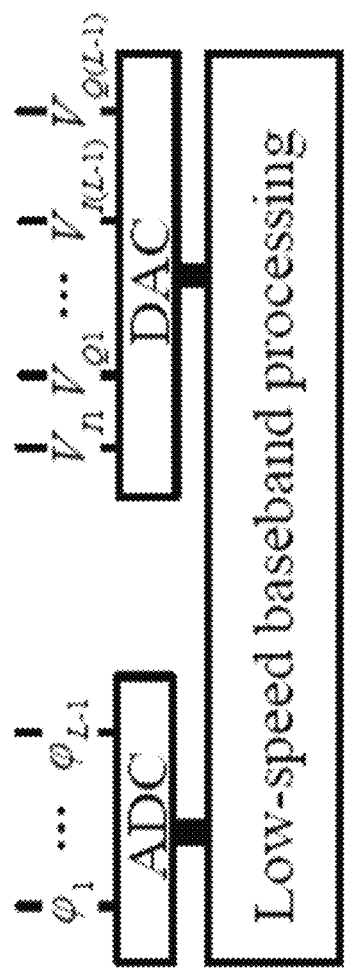
FIG. 6 depicts a graph showing implementation of beamforming control unit of the present invention with multichannel, low sampling rate ADC and DAC.

Since both signals of the vector control and the waveform delay are slowly changing signals, the beamforming baseband unit can also be realized by low sampling rate, multichannel ADCs and DACs, and low-speed baseband processing devices, as shown in FIG. 6. The ADCs are used to sample the voltages $\varphi_1$ to $\varphi_{L-1}$ representing the phase delay outputs from the wideband waveform delay detectors, and the DACs are used to generate the voltages $V_{1I}$, $V_{2I}$, ... $V_{(L-1)I}$ and $V_{1Q}$, $V_{2Q}$, $V_{(L-1)Q}$ for the vector control of the RF signals. DSPs and/or FPGA can be used to carry out the baseband processing by running the complex domain beamforming algorithms. Again, both the inputs to and the outputs from the baseband processing unit are digitized slowly changing signals.

Based on the above discussion, the output $out_{BF}$ of the proposed RF beamforming system is:

$$out_{BF} = x_0 + \sum_{i=1}^{L-1} out_{VMi} \quad (9)$$
$$= A\sin(2\pi ft + \Phi(t) + \psi)$$

which is the summation of all the L-channel RF output signals, whose amplitude A and phase delay $\psi$ have been controlled by the complex numbers computed by algorithms run in the beamforming baseband unit. Obviously, the RF signal outBF can be sent to any one-channel RF receiver, including a state of the art SDR receiver, for further signal processing. Therefore, the proposed architecture is able to avoid massive use of expensive T/R modules and high-speed digital and mixed signal devices, achieving low-power, cost-effective phased array and beamforming systems.

To verify the effectiveness of the proposed approach, an exemplary embodiment with five antenna elements and RF channels is hereby described, with reference to the Figures.

Figure 7A:
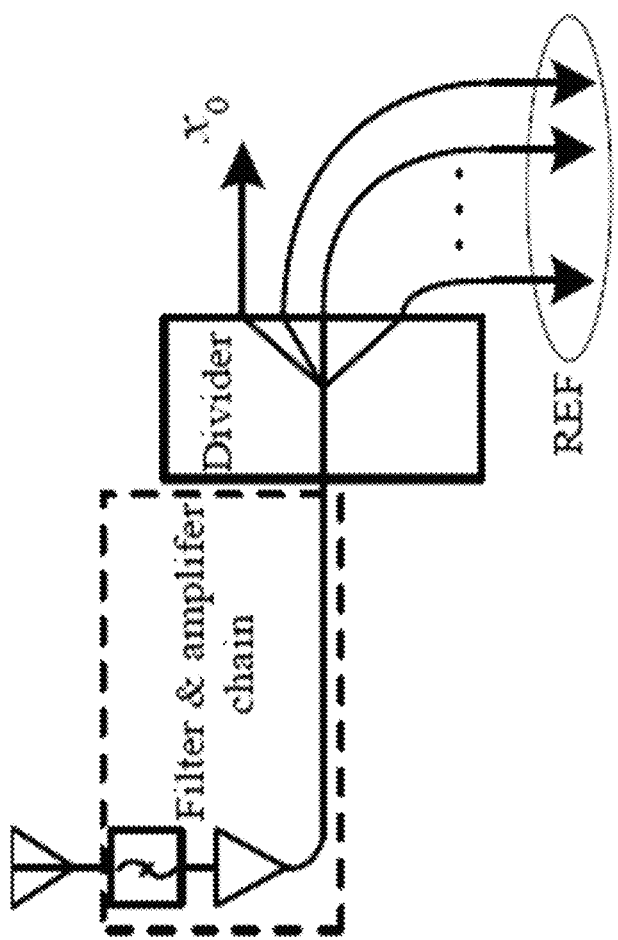
FIG. 7A depicts a schematic of the present invention showing the reference dispatch unit.

FIG. 7A shows the schematic of the reference dispatching unit. The signal received by the antenna is firstly filtered to suppress out-of-band noises, and then amplified by an amplifier chain consisting of an RF low noise amplifier (LNA) and a gain block device. Then, the signal is divided into L signals, where the signal x0 is directly sent to the combiner shown in FIG. 2, and the other L−1 REF signals are sent to the L−1 waveform delay detectors, to extract the waveform delays between the RF signal x0 and the other received signals

TABLE I

Devices used in the prototype

| ID | Device | Manufacturer | Function |
| --- | --- | --- | --- |
| 1 | SN65LVDT14 | TI | LVDS Interface |
| 2 | SN65LVDT41 | TI | LVDS Interface |
| 3 | ABA31563 | Avago Tech | RF Amplifier |
| 4 | ADL5390 | Analog Devices | Vector Multiplier |
| 5 | SCA-4-20+ | Mini-Circuits | Power Combiner/Splitter |
| 6 | SP-2G1+ | Mini-Circuits | Power Combiner/Splitter |
| 7 | QCN-19D+ | Mini-Circuits | Power Combiner/Splitter |
| 8 | AD8302 | Analog Devices | Gain and Phase Detector |
| 9 | AD7689 | Analog Devices | ADC |
| 10 | AD5668 | Analog Devices | DAC |
| 11 | STM32 | ST Electronics | Micro Processing Unit |

Figure 7B:
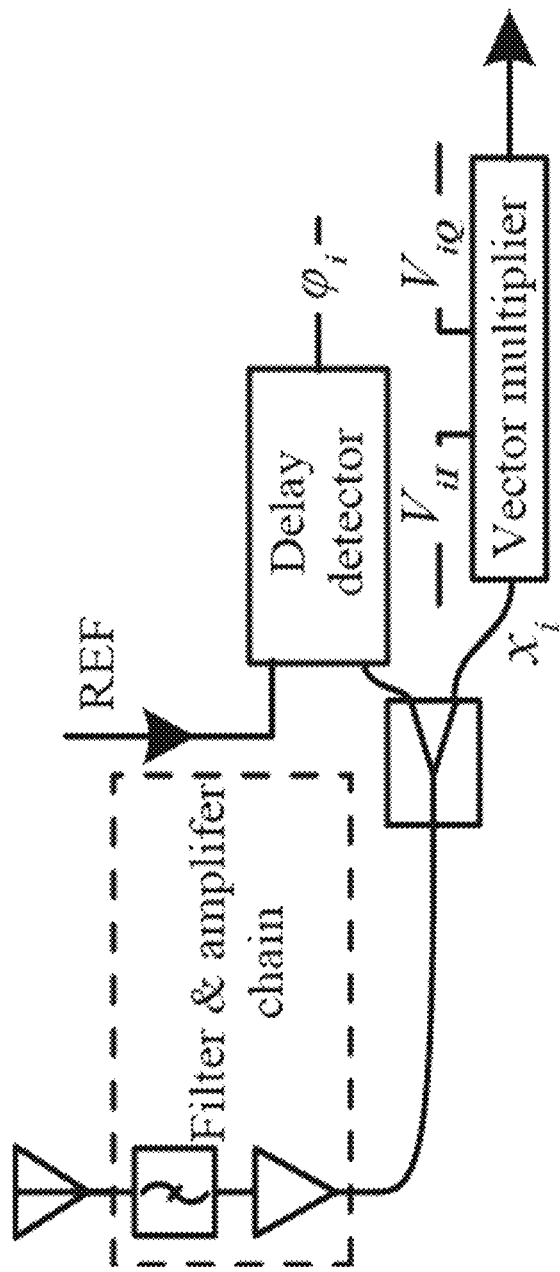
FIG. 7B depicts a schematic of the present invention showing the waveform delay detector and vector control unit.

FIG. 7B shows the schematic of the i-th RF channel with the waveform delay detector and the vector RF multiplier, whose antenna element, filter and RF amplifiers are the same as those in FIG. 7A. The amplified RF signal is divided into two parts, which are used as the inputs to the waveform delay detector and the vector multiplier, respectively. The output of the waveform delay detector $\varphi_i$ is sampled by an ADC channel, and the amplitude and phase of the input signal will be controlled by signals $V_{iI}$ and $V_{iQ}$, which are generated by a DAC channel.

Figure 8:
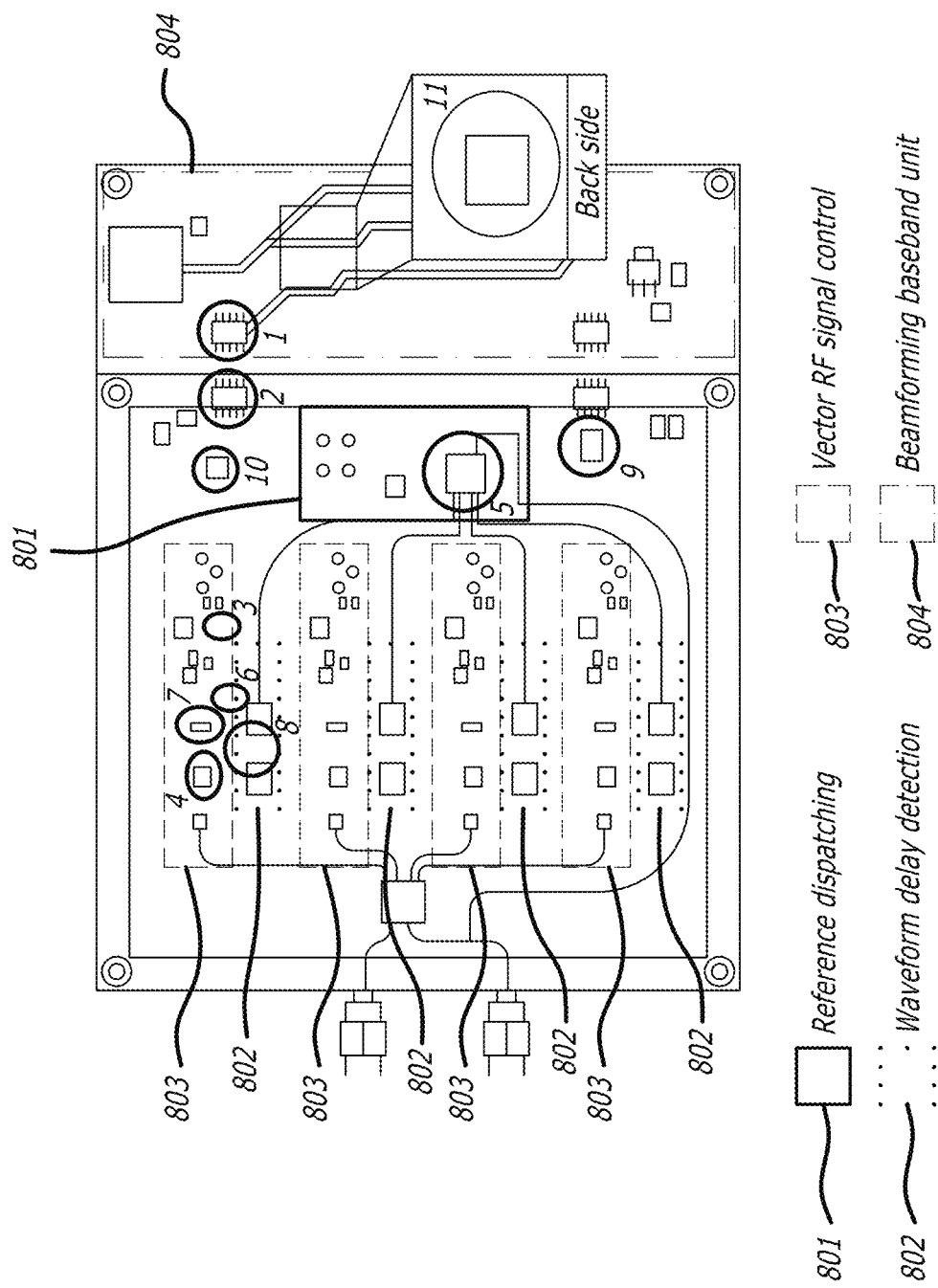
FIG. 8 depicts a photograph of a prototype of the beamforming system of the present invention.

FIG. 8 is the photograph of a fabricated system of the present invention based on commercial components, whose size is about 150×110 mm². The system consists of one reference channel 801 and four delay detection/vector control channels 803. In each channel 803, the LNA 7 is a Mini-Circuits PMA2-162LN+, while the gain block 3 is Avago Tech ABA31563. The filter is designed by lumped components. In the reference channel 801, two power splitters 5, Mini-Circuits SCA-4-20+ 5 and SP-2G1+ 6, are used to generate the four REF signals. The vector multiplier 4 is implemented by ADI ADL5390, and the related quadrature power divider 7 is Mini-Circuits QCN-19D+. The ADI's AD8302 8 is used to serve as the waveform delay detector 802, whose outputs are sampled by ADI's ADC product AD7689 9. The control signals for the vector multiplier are generated by ADI's DAC product AD5668 10.

In the beamforming baseband unit 804, a microprocessor, ST Electronics STM32 (on the bottom side of the board) 11, is used to control the ADCs and the DACs. In order to block the interference from the digital devices, the analog ground of the RF front is separated from the digital ground by low-voltage differential signaling (LVDS) interfaces, TI SN65LVDT14 1 and SN65LVDT41 2. The main devices used in the prototype are also listed in Table I, wherein the ID corresponds to numbers 1-11 in FIG. 8.

Figure 9B:
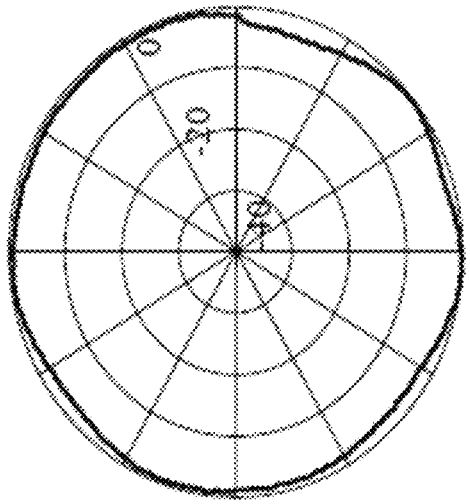
FIG. 9B depicts a graph showing a normalized pattern on the H-plane.
Figure 9C:
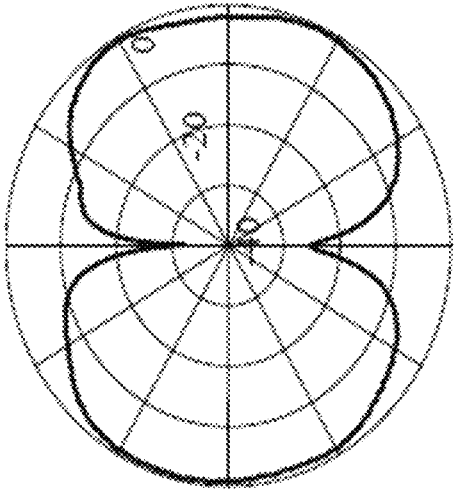
FIG. 9C depicts a graph showing a normalized pattern on the E-plane.
Figure 9A:
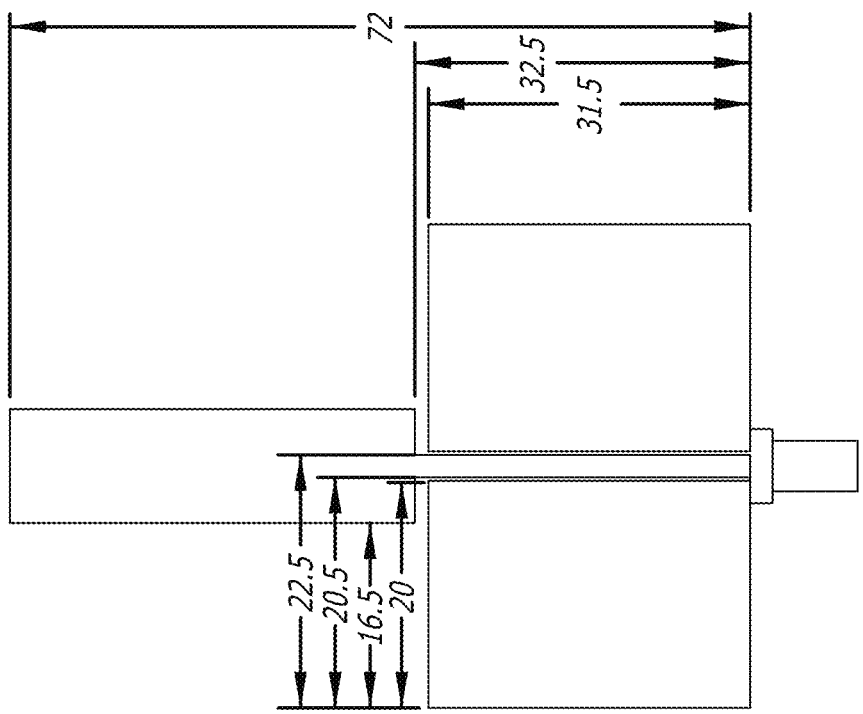
FIG. 9A depicts a photograph of a monopole antenna element of the present invention.
Figure 9D:
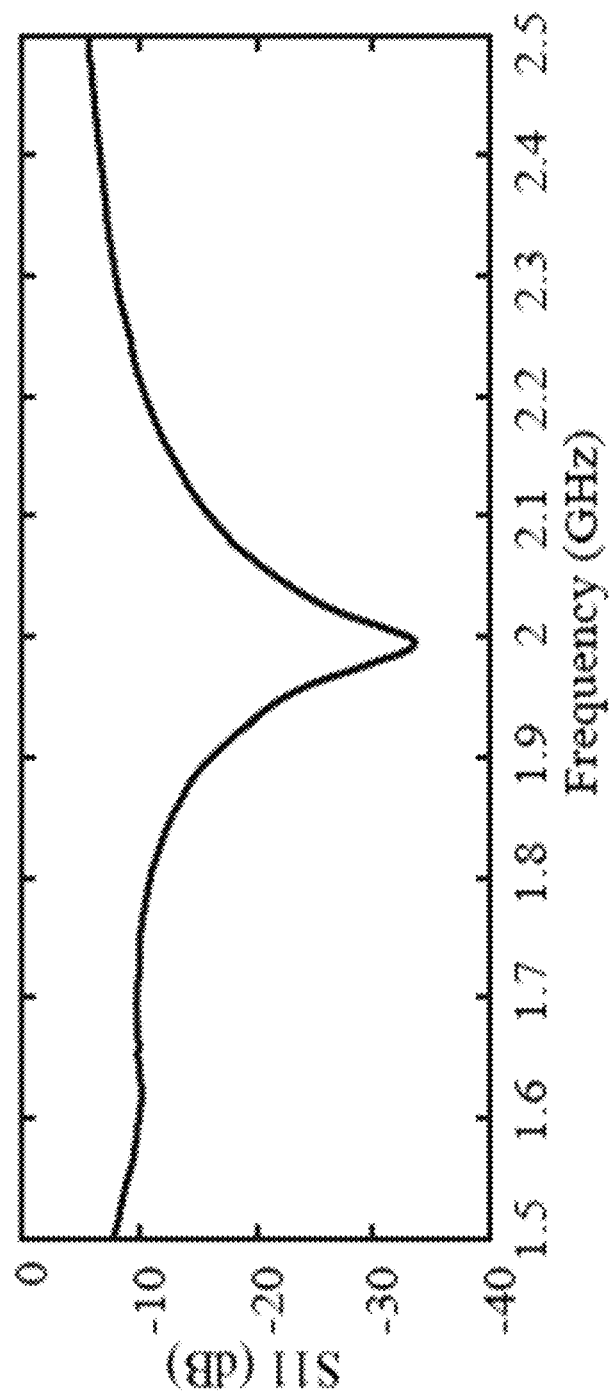
FIG. 9D depicts a graph showing measured S11 of the monopole antenna element.

For the described exemplary embodiment, a linear array consisting of five co-planar waveguide (CPW) fed monopoles is designed and fabricated. Each monopole antenna is printed on a 1-mm-thick, 82×63 mm² sized FR4 board, as shown in FIG. 9A. The dimensions are marked in mm. Such monopoles work at 2 GHz with a designed gain of 2.3 dBi, whose normalized E- and H-plane radiation patterns are measured in an anechoic chamber, as shown in FIG. 9B and FIG. 9C, respectively. It is seen that such patterns are similar to the pattern of an ideal monopole antenna. The measured S11 of the monopole is shown in FIG. 9D.

FIG. 10A shows the photograph of the five-element monopole array of the exemplary embodiment, in which neighboring antennas are separated by half a wavelength. The supporter of the array is made of Styrofoam, whose dielectric constant is very close to 1. FIG. 10B shows how the array is connected to the RF frontend with coaxial cables.

The mutual coupling between the radiating elements mainly comes from the near-field coupling. In our prototype, the distance between the adjacent monopoles is half a wavelength. The measured correlation coefficient is 0.0022, which can be ignored in our case. This result complies with the previous research on the mutual coupling between monopoles. The impacts of mutual coupling on the performance of phased arrays have been discussed in many literatures, such as.

The following example demonstrates beamforming using a fabricated prototype, in which the nulling and broadening of radiation patterns based on complex domain algorithms as demonstrated by the present invention. All measurements were conducted in an anechoic chamber.

A power inversion method is used in many adaptive nulling algorithms to suppress interferences from unknown incident directions by tuning nulls of the radiation pattern to such directions. Previously, such nulling algorithms are designed for BB beamforming based on SDR architectures, in which the wideband IF or baseband signals are digitized and processed in time domain. In the following, we will demonstrate power inversion based nulling using the proposed "complex domain" architecture, in which the slowly changed waveform delays are detected and controlled in RF domain directly with complex numbers. In order to do so, slight modifications to the original power inversion algorithm are made, to describe signals in terms of waveform delay and amplitude difference between RF signals.

For the five-element linear array, the received RF signals can be expressed as $$x=[x_0,x_1,x_2,x_3,x_4]^T, \quad (10)$$

where $x_0$ is the RF signal received by the reference channel. Note that in our system, signals x is not sampled. Instead, the phase delay $\varphi$, $$\varphi=[\varphi_0,\varphi_1,\varphi_2,\varphi_3,\varphi_4]^T, \quad (11)$$

is sampled using narrowband ADCs, where $\varphi_0$ is assigned as a zero phase. Then in the baseband processing unit, the rebuilt signal for beamforming in the beamforming control unit can be expressed as $$s=[s_0, \ldots, s_i, \ldots, s_4]^T, \quad (12)$$

in which $$s_i = \exp\left(j\frac{2\pi n}{N} + j\varphi_i\right), \quad (13)$$

where N is the sampling number, n is an integer, and 0≤n<N.

Assume the weight vector of the array is $$w=[w_0, \ldots, w_i, \ldots, w_4]^T, \quad (14)$$

where $$w_i=V_{iI}+jV_{iQ} \quad (15)$$

is the complex weight for controlling the i-th vector multiplier, and H denotes the conjugate transpose. In power inversion algorithm, the optimal weight $w_{opt}$ can be obtained by solving $$w_{opt} = \underset{w}{\operatorname{argmin}} \sum_{n=0}^{N-1} |w^H s|^2, \quad (16)$$

which can be directly calculated by applying the direct least square algorithm [33], i.e., $$w_{opt} = R_{ss}^{-1} r_{ss}, \quad (17)$$

where $$R_{ss} = \sum_{n=0}^{N-1} ss^H, \quad (18)$$

$$r_{ss} = \sum_{n=0}^{N-1} ss_0^*. \quad (19)$$

For the proposed prototype, the complex vector $w_{opt} = V_{opt1} + jV_{optQ}$ can be used as the inputs for each vector multiplier.

The output signal $\text{out}_{PI}$ is:

$$\text{out}_{PI} = w^H x, \quad (20)$$

In the present example two cases are demonstrated, where a single interference is assumed to be incident from the zenith angle of 0 and 40 degrees in the H plane, respectively. In each case, the optimized complex values of $w_{opt}$ are shown in Table II.

TABLE II

Parameters used for power inversion nulling

| Direction | Antenna | $V_{optI}$ (V) | $V_{optQ}$ (V) |
|---|---|---|---|
| 0° | 0 | 0.0000 | 1.0000 |
|  | 1 | −0.2263 | −0.1839 |
|  | 2 | −0.4255 | 0.3507 |
|  | 3 | 0.3124 | −1.2815 |
|  | 4 | 0.3550 | 0.1215 |
| 40° | 0 | 0.0000 | 1.0000 |
|  | 1 | 0.0346 | 1.7998 |
|  | 2 | −0.4089 | −0.4737 |
|  | 3 | −1.3637 | −0.9981 |
|  | 4 | −0.8337 | −1.3447 |

To verify the performance of the proposed "complex domain" frontend, the complex values of $w_{opt}$ for different nulling directions optimized by a personal computer were sent to the microprocessor STM32 via a joint test action group (JTAG) download cable, to form different nulling patterns.

Figure 11A:
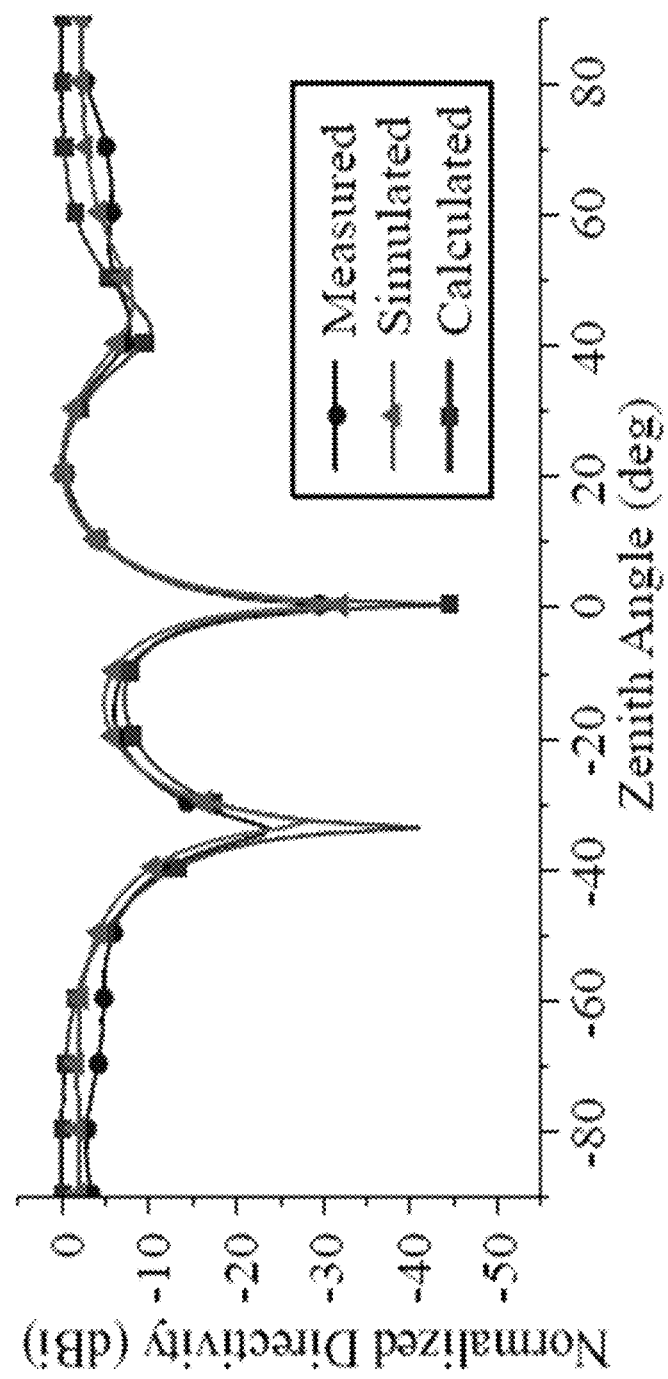
FIG. 11A depicts a chart providing a comparison between measured, simulated and calculated patterns when nulling to 0°.
Figure 11B:
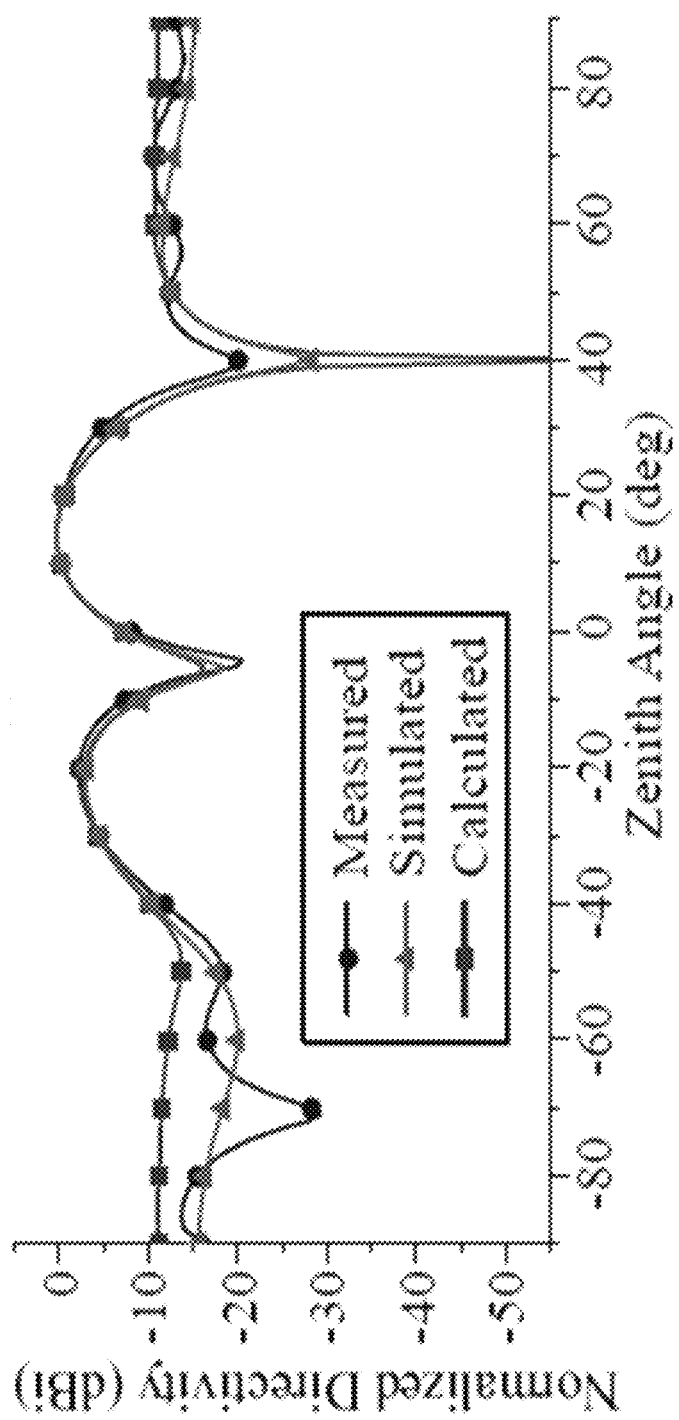
FIG. 11B depicts a chart providing a comparison between measured, simulated and calculated patterns when nulling to 40°.

FIGS. 11A and 11B show the experimental results, along with the simulated and calculated results for comparison. The full wave simulation is performed using CST MICROWAVE STUDIO™, and the calculation is based on (17). In both simulation and calculation, the same five-element linear monopole array is used. For both cases, the same data in Table II are used as the input weighting coefficients to control the amplitudes and phases of the RF signals.

It is seen that in both cases, the obtained nulling results comply with each other, especially in the intended directions of nulling. The depth of the nulls in these directions ranges between −20 dB and −30 dB in the experiments, meaning a good suppression effect to the incident interference.

In FIGS. 11A-B, along with the expected deep nulls, there also exist other dips in directions other than the nulling directions. For instance, when nulling to 0° direction in FIG. 11A, there are also a deep null in the direction around −37° zenith angle, and a shallow null around 40° zenith angle. It should be noted that such nulls are the by-products of the power inversion algorithm. The relationship between the wanted and the unwanted nulls is similar to the relationship between the main lobe and the side lobes when forming steering lobes. Similar results were also reported in. This disadvantage can be avoided by optimizing all the other nulls, as shown in the following.

It is usually difficult to synthesize a wide-angle coverage beam for an array antenna. However, a beamforming using an algorithm can be used to automatically synthesize a beam with a wide-angle coverage and a single deep null pointing to a direction of no interest. In scenarios such as GPS applications, this null can be tuned to a direction where there is not a navigation satellite, obtaining an "effective" quasi-hemispheric beam in the H plane for the receiver. The mechanism behind this approach is Gaussian noise-based stochastic optimization on the orientation and depth of all the nulls of the radiation pattern.

In order to obtain such a special radiation pattern, the far field radiation of an L-element linear array is re-written as:

$$E(Z) = Z^{-(L-1)} \prod_{m=1}^{L-1} (Z - Z_m), \quad (21)$$

where $Z_m = \alpha_m \exp(-j\beta_m)$ is the m-th null of $E(Z)$, $\alpha_m$ and $\beta_m$ determine the depth and orientation of the m-th null, respectively [35]. Therefore, each null can be independently controlled by tuning the complex number $Z_m$.

In order to get the optimized $Z_m$ to realize an "effective" quasi-hemispheric beam, a hypothetical interference is assumed with a known incident direction in the digital domain. In the five-element phased array, the interference signal received by each channel has a different phase, which can be expressed as:

$$v = [v_0, v_1, \ldots, v_i, \ldots, v_4]^T \quad (22)$$

where $$v_i = \exp\left(-j\pi i \sin\frac{\theta\pi}{180}\right), \quad (23)$$

with θ being the direction of the hypothetical interference. The hypothetical interference signal can be expressed as:

$$s_{interference} = v \times I \exp\left(\frac{2\pi j n}{N}\right) + e, \quad (24)$$

where I represents the power of the interference, N is the number of samples, n is an integer such that $0 \leq n < N$, and e is the Gaussian white noise. The optimized weight $w_{opt}$ is $$w_{opt} = \underset{w}{\operatorname{argmin}} \sum_{n=0}^{N-1} |w^H s_{interference}|^2. \quad (25)$$

Similarly, $w_{opt} = V_{optI} + jV_{optQ}$ can be directly used as the complex number for the input of the vector multipliers in the present invention.

In the example, three cases are presented where the single deep nulls are tuned to the directions with zenith angle of 0, 40 and 80 degrees in the H plane, respectively. In each case, the optimized complex values of $w_{opt}$ are shown in Table III.

TABLE III

Parameters used for beam broadening.

| Direction | Antenna | $V_{optI}$ (V) | $V_{optQ}$ (V) |
|---|---|---|---|
| 0° | 0 | 0.0000 | 1.0000 |
| | 1 | 0.0329 | −0.3920 |
| | 2 | 0.0247 | −0.3140 |
| | 3 | −0.1092 | −0.2429 |
| | 4 | 0.0609 | −0.0490 |
| 40° | 0 | 0.0000 | 1.0000 |
| | 1 | 0.2831 | 0.1219 |
| | 2 | −0.2059 | 0.1961 |
| | 3 | 0.0221 | −0.1910 |
| | 4 | 0.2230 | 0.0361 |
| 80° | 0 | 0.0000 | 1.0000 |
| | 1 | 0.0059 | 0.3060 |
| | 2 | −0.0366 | −0.2745 |
| | 3 | 0.0910 | 0.2220 |
| | 4 | 0.0261 | −0.1810 |

Figure 12A:
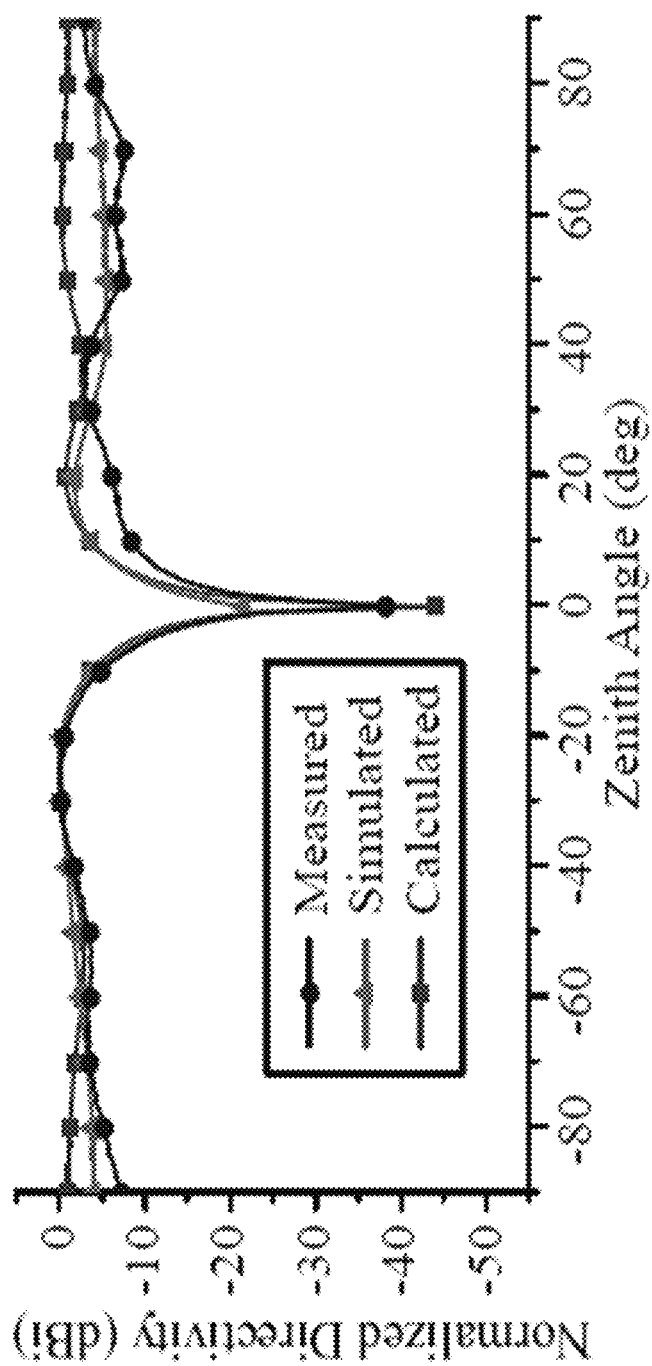
FIG. 12A depicts a chart providing a comparison between measured, simulated and calculated patterns when nulling to 0°.
Figure 12B:
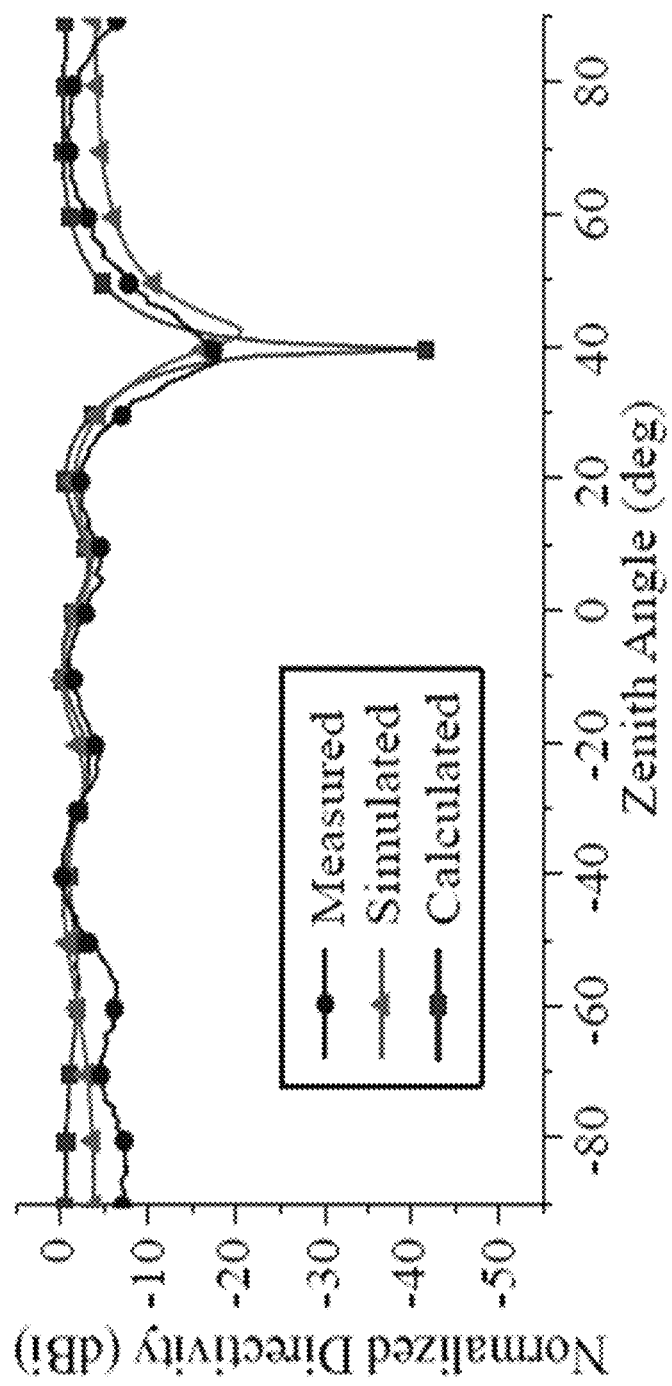
FIG. 12B depicts a chart providing a comparison between measured, simulated and calculated patterns when nulling to 40°.
Figure 12C:
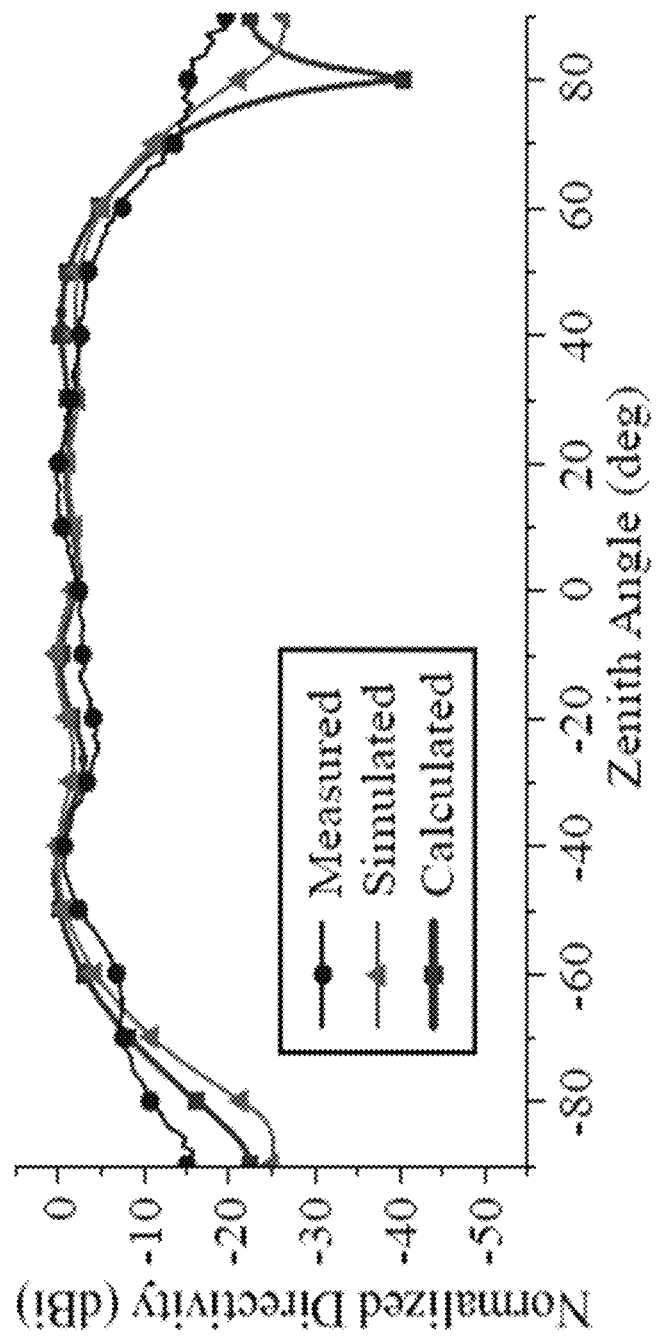
FIG. 12C depicts a chart providing a comparison between measured, simulated and calculated patterns when nulling to 80°.
Figure 13:
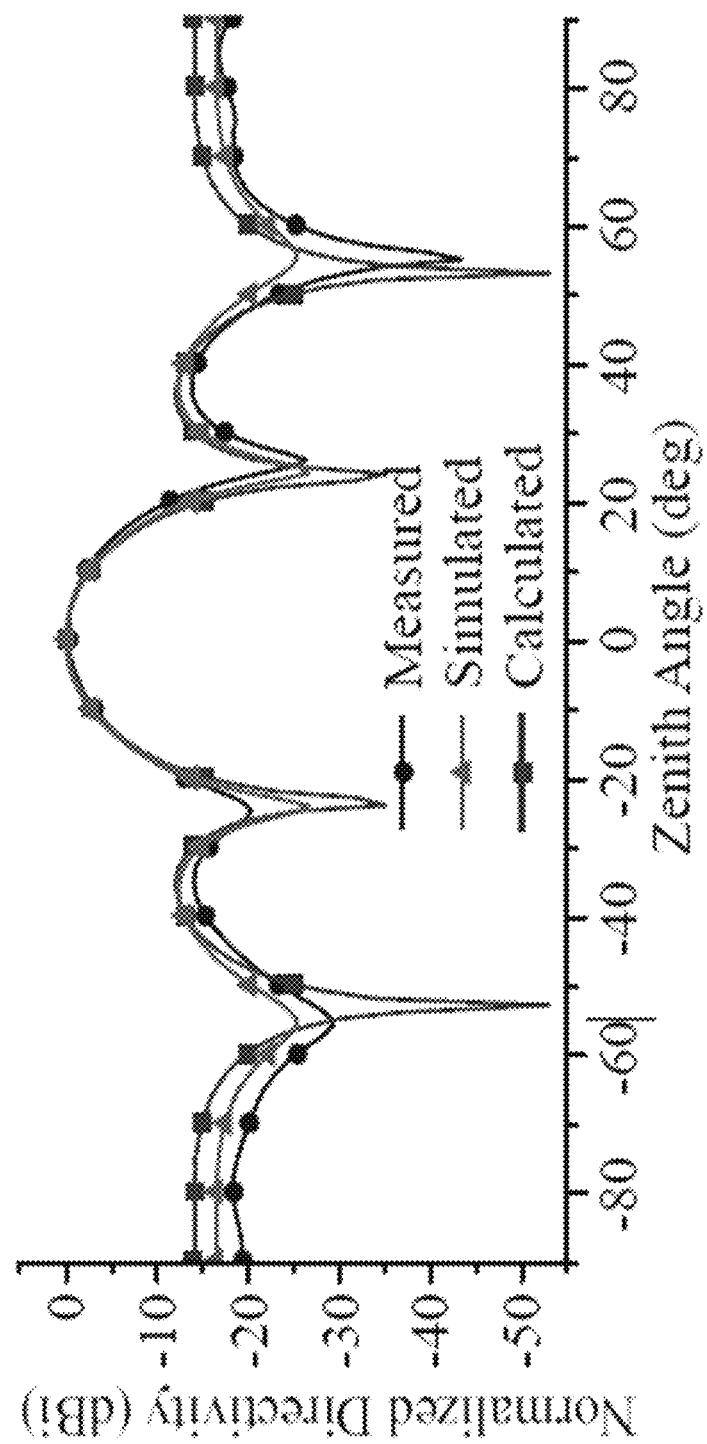
FIG. 13 depicts a chart providing comparison of the patterns with normalized weights in calculation, simulation and experiment.

Results shown in FIGS. 12A-C are also compared with the measured and the simulated results for three cases when the single deep null is optimized to point to 0°, 40° and 80°, respectively. From the calculated results, the algorithm can effectively tune the deep null to the desired direction and thus flatten the main lobe to obtain a wide-angle coverage. In FIG. 12A, the null is directed to 0° and the pattern is flat in other directions. The quasi-hemispheric coverage in H plane is obtained if there is no signal incident from the 0° direction. Even when the nulls are directed to large zenith angle, i.e., 80° as shown in FIG. 12C, the beam width of the pattern is still much larger than the original pattern with an in-phase feeding, which is shown in FIG. 13. FIG. 12 shows again that the measured, simulated and calculated results from (25) comply with each other, validating the effectiveness of the proposed approach.

Comparing the results shown in FIG. 12 and FIG. 11, the by-product nulls existed in FIG. 11 disappear in FIG. 12. This is because the algorithm developed based on (21) is able to independently optimize all the four nulls. In order to obtain a wide-angle coverage beam, except for the single deep null, the rest three nulls can be optimized to be as shallow as possible.

The same as the conventional phased array systems, the imperfection of analog components may degrade the beamforming performance, and proper calibrations can be used to compensate for this imperfection. In our architecture, such imperfections can be eliminated by adding calibration offsets to the inputs of vector multipliers. On the other hand, the nulling direction does not notably deviate until the amplitude and phase errors reach 3 dB and 6 degrees, respectively.

This means that small variations due to the imperfection of RF components only have limited effect on the beamforming.

In broadband applications, the proposed architecture faces the same challenges as conventional phased arrays do. In order to obtain a broadband system, all components in the receiving and transmitting chains should have sufficient wideband performance, including the gain flatness, insertion loss flatness, and the dispersion of group delays. The key components used to implement our architecture, i.e., the waveform delay detector (AD8302, bandwidth from DC to 2.7 GHz) and the vector multiplier (ADL5390, bandwidth from 20 MHz to 2.4 GHz), are both wideband devices. It is therefore feasible to implement broadband beamforming systems using the architecture of the present invention.

A phased array based beamforming system is not necessarily a wideband system, in which case the conventional SDR architectured phased array can be redundant for beamforming applications. Instead, a self-contained beamforming architecture is presented as one embodiment of the present invention that can be implemented with narrowband devices, to effectively avoid the disadvantages of high power consumption, high cost, and system complexity due to the massive use of T/R modules and high-speed digital and mixed signal devices. Such a "complex domain" RF frontend is able to separate the waveform delay information from the RF signals, and simultaneously control the amplitude and phase delay of each RF signal using complex numbers computed by the beamforming algorithms derived in complex domain. A prototype developed with commercial components verified the effectiveness of the present invention by demonstrating the adaptive nulling and broadening of radiation patterns. Using the system of the present invention, the massive use of conventional T/R modules and high-speed baseband devices can be avoided, and additional beamforming functions can be conveniently introduced to arbitrary one-channel receivers without any modification. It is therefore anticipated that the present invention will be widely used in low cost, power efficient beamforming applications.

Those skilled in the art will recognize that the methods and articles of the present invention may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known manners for carrying out the described features and functions and interfaces, as well as those variations and modifications that may be made to the hardware or software or firmware components described herein as would be understood by those skilled in the art now and hereafter.

Alternative embodiments are contemplated in which the order of the various operations is altered and in which sub-operations described as being part of a larger operation are performed independently. While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

REFERENCES

[1] H. J. Visser, *Array and Phased Array Antenna Basics*. Chichester, U.K.: Wiley, 2006.
[2] L. Stark, "Microwave theory of phased-array antennas-A review," *Proc. IEEE*, vol. 62, no. 12, pp. 1661-1701, December 1974.
[3] R. J. Mailloux, "Phased array theory and technology," *IEEE Proc.*, vol. 70, no. 3, pp. 246-291, March 1982.
[4] I. Chiba, R. Miura, T. Tanaka, and Y. Karasawa, "Digital beam forming (DBF) antenna system for mobile communications," *IEEE Aerosp. Electron. Syst. Mag.*, vol. 12, no. 9, pp. 31-41, September 1997.
[5] L. C. Godara, "Application of antenna arrays to mobile communications. II. Beamforming and direction-of-arrival considerations," *IEEE Proc.*, vol. 85, no. 8, pp. 1195-1245, August 1997.
[6] O. G. Vendik and D. S. Kozlov, "Phased Antenna Array with a Sidelobe Cancellation for Suppression of Jamming," *IEEE Antennas Wireless Propag. Lett.*, vol. 11, pp. 648-650, June 2012.
[7] B. Widrow and S. D. Stearns, *Adaptive Signal Processing*, Prentice-Hall, 1985.
[8] N. K. Jablon, "Adaptive beamforming with the generalized sidelobe canceller in the presence of array imperfections," *IEEE Trans. Antennas Propag.*, vol. 34, no. 8, pp. 996-1012, August 1986.
[9] X. Yang, P. Yin, T. Zeng, and T. K. Sarkar, "Applying Auxiliary Array to Suppress Mainlobe Interference for Ground-Based Radar," *IEEE Antennas Wireless Propag. Lett.*, vol. 12, pp. 433-436, March 2013.
[10] K.-B. Yu and D. J. Murrow, "Adaptive digital beamforming for angle estimation in jamming," *IEEE Trans. Aerosp. Electron. Syst.*, vol. 37, no. 2, pp. 508-523, April 2001.
[11] K. H. Lai, I. D. Longstaff, and G. D. Callaghan, "Super-fast scanning technique for phased array weather radar applications," *Inst. Elect, Eng. Proc. Radar, Sonar Navig.*, vol. 151, no. 5, pp. 271-279, October 2004.
[12] G. Zhang, R. J. Doviak, D. S. Zrnic, J. Crain, D. Staiman, and Y. Al-Rashid, "Phased Array Radar Polarimetry for Weather Sensing: A Theoretical Formulation for Bias Corrections," *IEEE Trans. Geosci. Remote Sens.*, vol. 47, no. 11, pp. 3679-3689, October 2009.
[13] G. Swamp and K. Yang, "Phase adjustment of large antennas," *IRE Trans. Antennas Propag.*, vol. 9, no. 1, pp. 75-81, January 1961.
[14] A. W. Gunst and M. J. Bentum, "The LOFAR phased array telescope system," in *IEEE Int. Symp. on Phased Array Systems and Technology (ARRAY)*, Waltham, Mass., 2010, pp. 632-639.
[15] F. Ollivier, P. Cervenka, and P. Alais, "Side scan sonar using phased arrays for high resolution imaging and wide swath bathymetry," *Inst. Elect, Eng. Proc. Radar, Sonar Navig.*, vol. 143, no. 3, p. 163-168, June 1996.
[16] 0. T. Von Ramm and S. W. Smith, "Beam Steering with Linear Arrays," *IEEE Trans. Biomed. Eng.*, vol. BME-30, no. 8, pp. 438-452, August 1983.
[17] R. Telikepalli, P. C. Strickland, K. R. McKay, and J. S. Wight, "Wide band microstrip phased array for mobile satellite communications," *IEEE Trans. Microw. Theory Techn.*, vol. 43, no. 7, pp. 1758-1763, July 1995.
[18] L. D. DiDomenico and G. M. Rebeiz, "Digital communications using self-phased arrays," *IEEE Trans. Microw. Theory Techn*, vol. 49, no. 4, pp. 677-684, April 2001.
[19] E. Buracchini, "The software radio concept," *IEEE Commun. Mag.*, vol. 38, no. 9, pp. 138-143, September 2000.
[20] H. Steyskal, "Digital beamforming—an emerging technology," in *IEEE Military Communications Conf. (MILCOM), Conf. rec. 21st Century Military Communications—What's Possible?* San Diego, Calif., 1988, vol. 2, pp. 399-403.
[21] J. Klare, "Digital Beamforming for a 3D MIMO SAR—Improvements through Frequency and Waveform Diversity," in *IEEE Int. Geoscience and Remote Sensing Symp. (IGARSS)*, Boston, Mass., 2008, vol. 5, pp. V-17-V-20.
[22] R. Miura, T. Tanaka, I. Chiba, A. Horie, and Y. Karasawa, "Beamforming experiment with a DBF multibeam antenna in a mobile satellite environment," *IEEE Trans. Antennas Propag.*, vol. 45, no. 4, pp. 707-714, April 1997.
[23] B. D. Steinberg, "Digital beamforming in ultrasound," *IEEE Trans. Ultrason. Ferroelectr. Freq. Control.*, vol. 39, no. 6, pp. 716-721, November 1992.
[24] M. Younis, C. Fischer, and W. Wiesbeck, "Digital beamforming in SAR systems," *IEEE Trans. Geosci. Remote Sens.*, vol. 41, no. 7, pp. 1735-1739, July 2003.
[25] R. C. Hansen, *Phased array antennas*, vol. 213. John Wiley & Sons, 2009.
[26] A. Matsuzawa, "Trends in high speed ADC design," in *IEEE 7th Int. Conf. on ASIC (ASICON)*, Guilin, 2007, pp. 245-248.
[27] W.-D. Wirth, *Radar Techniques Using Array Antennas (FEE Radar, Sonar, Navigation & Avionics Series)*, no. 10, IET, 2001.
[28] P. Horowitz and W. Hill, "The art of electronics. 2nd." Cambridge University Press Cambridge, 1996.
[29] S. Blanch, J. Romeu, and I. Corbella, "Exact representation of antenna system diversity performance from input parameter description," *Electron. Lett.*, vol. 39, no. 9, pp. 705-707, May 2003.
[30] X. Wang, H. D. Nguyen, and H. T. Hui, "Correlation coefficient expression by S-parameters for two omnidirectional MIMO antennas," in *IEEE Int. Symp. on Antennas and Propagation (APSURSI)*, Spokane, W A, 2011, pp. 301-304.
[31] I. J. Gupta and A. A. Ksienski, "Effect of mutual coupling on the performance of adaptive arrays," *IEEE Trans. Antennas Propag.*, vol. 31, no. 5, pp. 785-791, September 1983
[32] R. T. Compton Jr., "The Power-Inversion Adaptive Array: Concept and Performance," *IEEE Trans. Aerosp. Electron. Syst.*, vol. AES-15, no. 6, pp. 803-814, November 1979.
[33] T. E. Biedka, W. H. Tranter, and J. H. Reed, "Convergence analysis of the least squares constant modulus algorithm in interference cancellation applications," *IEEE Trans. Commun.*, vol. 48, no. 3, pp. 491-501, March 2000.
[34] C. C. Ko, "A fast squares power inversion array for tracking nonstationary environments," *IEEE Trans. Signal Process.*, vol. 48, no. 6, pp. 1811-1814, June 2000.

[35] Z. Peng, T. Hu, W. Cui, J. Huangfu, C. Li, and L. Ran, "Unconventional Beamforming for Quasi-Hemispheric Coverage of a Phased Array Antenna," *IEEE Antennas Wireless Propag. Lett.*, vol. 12, pp. 1654-1657, December 2013.

[36] C. C. Ko and J. Wen, "Fast null steering algorithm for arbitrary two-dimensional power inversion arrays," *Inst. Elect, Eng. Proc. H*, vol. 140, no. 6, pp. 469-473, December 1993.

[37] X. Hanlai, H. Haigen, and G. Yanchang, "Null control of pattern in antenna design," in *IEEE Int. Conf. on Microwave and Millimeter Wave Technology Proc. (ICMMT)*, Beijing, 1998, pp. 353-356.

What is claimed is:

1. A self-contained beamforming system, comprising:
   one or more antenna elements for receiving one or more radiofrequency (RF) signals;
   one or more corresponding RF amplifiers;
   one or more corresponding waveform delay detectors, wherein the one or more corresponding waveform delay detectors obtain waveform delays received by the one or more RF signals received by the one or more antenna elements and are capable of simultaneously controlling the amplitude and waveform delay of the one or more RF signals; and
   one or more corresponding vector multipliers, wherein the one or more corresponding vector multipliers perform beamforming in RF domain via implementation of said simultaneous control to the amplitude and waveform delay of each one or more corresponding RF signal;
   wherein the system automatically synthesizing a beam with a wide-angle coverage and a single deep null pointing to a direction of no interest.

2. The system of claim 1, further comprising a reference signal.

3. The system of claim 2, wherein the one or more corresponding RF amplifiers provide gains to the corresponding one or more RF signals.

4. The system of claim 3, wherein the one or more corresponding waveform delay detectors obtain the waveform delays between the reference signal and the one or more corresponding RF signals.

5. The system of claim 1, wherein the amplitude and phase of the one or more RF signals are simultaneously controlled by real and imaginary parts of complex numbers.

6. The system of claim 1, wherein the resulting beamforming is performed without the use of T/R modules and high-speed baseband devices.

7. A beamforming method, comprising:
   increasing the gain of one or more radiofrequency (RF) signals obtained from one or more corresponding antenna elements;
   detecting waveform delay of the one or more RF signals obtained from one or more corresponding waveform delay detectors capable of simultaneously controlling the amplitude and waveform delay of the one or more RF signals;
   performing beamforming in RF domain from one or more corresponding vector multipliers via implementation of said simultaneous control to the amplitude and waveform delay of each one or more corresponding RF signal; and
   automatically synthesizing a beam with a wide-angle coverage and a single deep null pointing to a direction of no interest.

8. The method of claim 7, further comprising obtaining a reference signal from an RF amplifier.

9. The method of claim 7, further comprising providing gains to the corresponding one or more RF signals using one or more corresponding RF amplifiers.

10. The method of claim 7, further comprising obtaining the waveform delays between the reference signal and one or more RF signals via one or more corresponding waveform delay detectors.

11. The method of claim 7, further comprising performing beamforming in RF domain by simultaneously controlling the amplitude and waveform delay of each corresponding RF signal.

12. The method of claim 7, further comprising simultaneously controlling the amplitude and phase of the one or more RF signals by real and imaginary parts of complex numbers to directly apply beamforming algorithms without needing any form of transformation.

13. The method of claim 7, further comprising performing beamforming without the use of T/R modules and high-speed baseband devices.

* * * * *